July 2, 1963 E. E. SANFORD 3,096,396

COLOR TELEVISION RECEPTION WITH POLYPHASE GRID SWITCHING

Filed Sept. 22, 1961 3 Sheets-Sheet 1

INVENTOR.
Emil Sanford

BY

William V. Pease
ATTORNEY.

COLOR TELEVISION RECEPTION WITH POLYPHASE GRID SWITCHING

Filed Sept. 22, 1961 3 Sheets-Sheet 2

INVENTOR.
Emil Sanford

BY [signature]

ATTORNEY.

July 2, 1963 E. E. SANFORD 3,096,396

COLOR TELEVISION RECEPTION WITH POLYPHASE GRID SWITCHING

Filed Sept. 22, 1961 3 Sheets-Sheet 3

INVENTOR.
Emil Sanford

BY

William V. Pence

ATTORNEY.

United States Patent Office 3,096,396

Patented July 2, 1963

3,096,396

COLOR TELEVISION RECEPTION WITH POLY-PHASE GRID SWITCHING

Emil E. Sanford, Clifton, N.J., assignor to Paramount Pictures Corporation, New York, N.Y., a corporation of New York Filed Sept. 22, 1961, Ser. No. 140,034
6 Claims. (Cl. 178—5.4)

This invention relates to the reception and display of color television signals of the color sub-carrier type, such as signals according to the N.T.S.C. standards, and more particularly to a cathode-ray tube, and associated receiver for display of such signals. The cathode-ray tube of the invention is of the post-deflection-focusing type having a fluorescent screen on which are laid down strips of material, fluorescent on electron impact in three primary colors. Color selection is achieved by means of a novel polyphase type switching grid, the tube being generally of the type described in United States Patent No. 2,692,532. The invention provides a grid and screen arrangement for the display and excitation of the fluorescent screen strips with resulting improvement in color, balance, brightness, resolution and contrast of the television signals with simplified decoding features.

The invention will now be described in detail with reference to the accompanying drawings in which:

FIGURE 1 is a diagrammatic view of a cathode-ray tube for purposes of illustration and showing a particular embodiment of the invention.

FIGURES 2*a*, 2*b*, 2*c* and 2*d* are diagrammatic fragmentary views of the screen and grid and modes of excitation according to proper phase orientation for explanation purposes.

Figure 4:
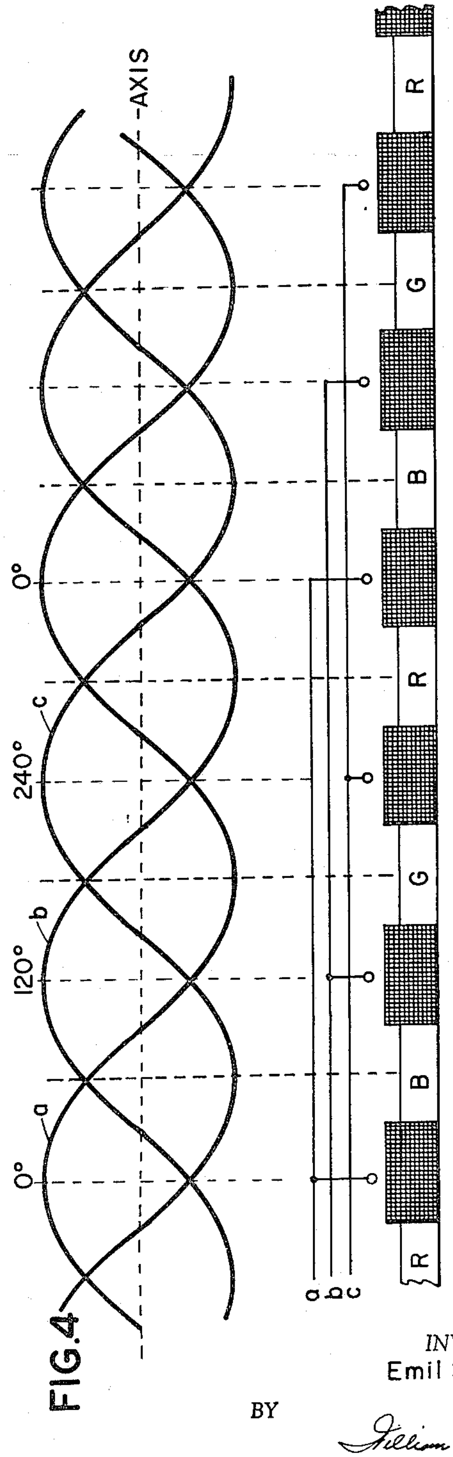
FIGURE 4 is a set of waveforms and their respective positions relative to the screen and useful in explaining the invention.
Figure 4A:
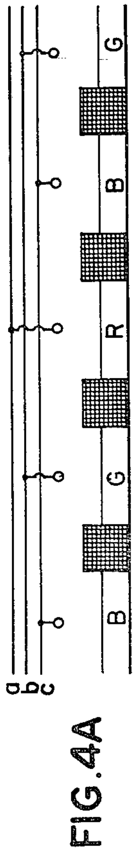

FIGURE 4*a* shows a screen whose phosphor guard band areas are different.

Figures 3, 5A, 5B:
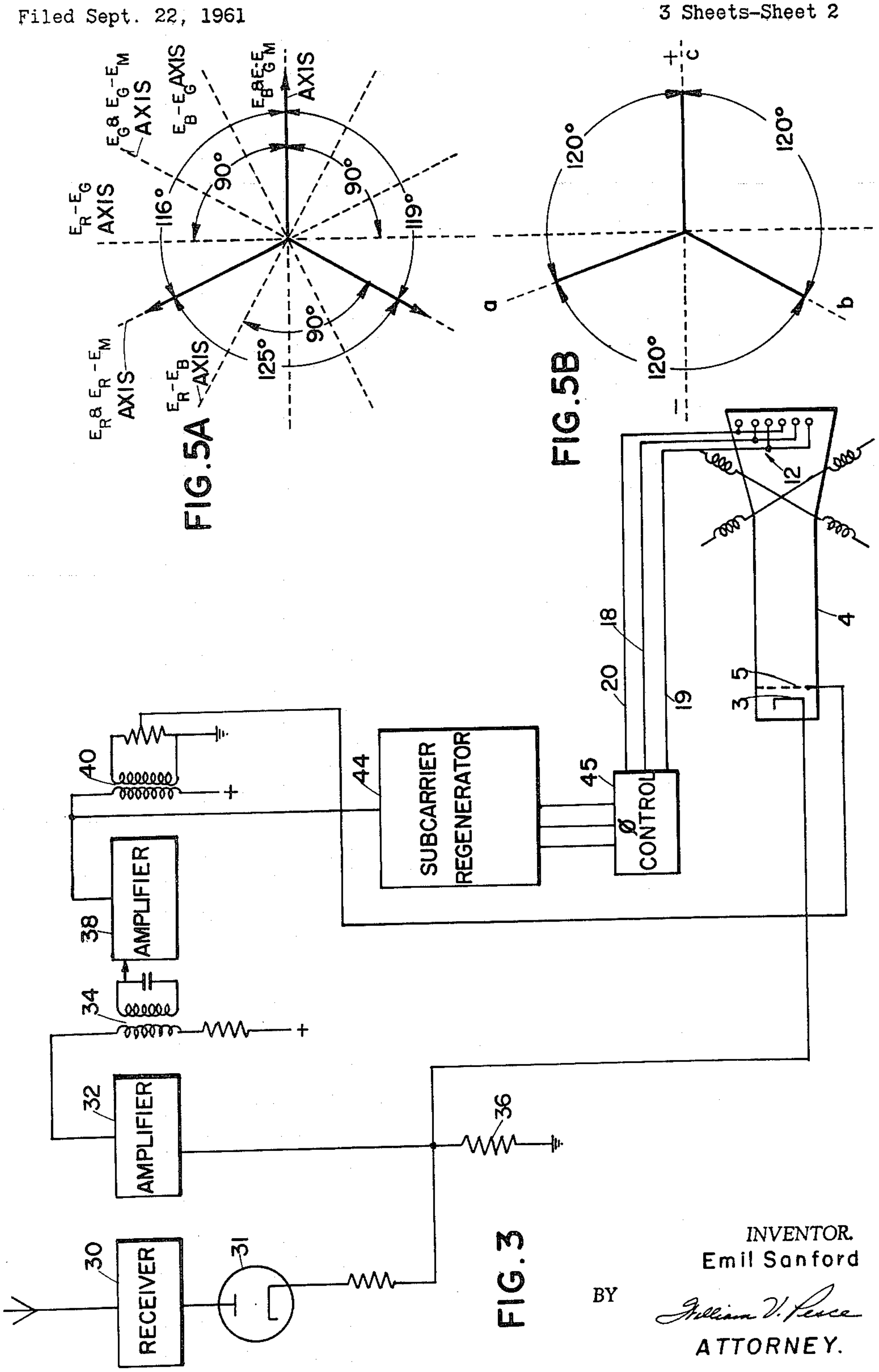
FIGURE 3 is a block diagram of one version of a television receiver and color cathode-ray according to the invention.

FIGURE 5*a* is a vector diagram showing the phase relation of the color signals as applied to the electron gun and useful in explaining the invention.

FIGURE 5*b* is a vector diagram of the switching voltages as supplied to the polyphase grid and useful in describing the invention.

Figure 6:
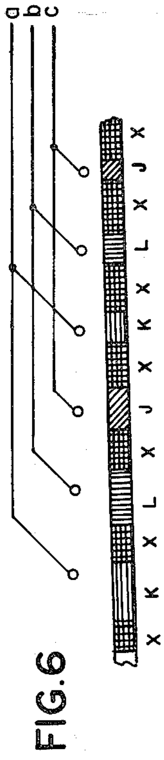

FIGURE 6 is a partial fragmentary view of the tube at one of its extremities for purposes of showing the spatial variations between grid and screen.

Figure 2A:
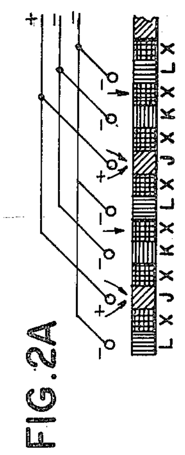
Figure 2B:
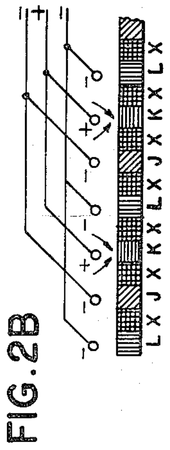
Figure 2C:
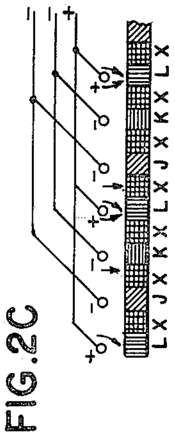
Figure 2D:
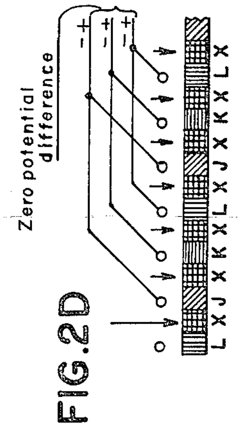
Figure 1:
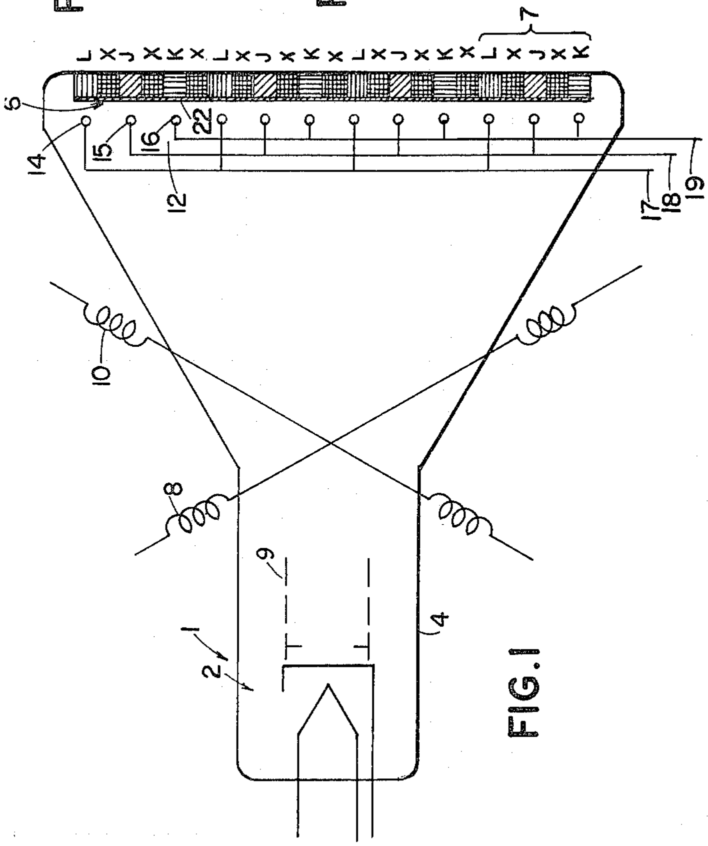

The cathode-ray tube of FIGURE 1 comprises an electron gun generally indicated as 2, disposed as per usual in the neck portion of an envelope 4. The gun develops a focused electron beam directed at a target area generally indicated at 6 and the beam is adapted to be scanned over the target area by means of scanning currents of the usual type applied to a set of crossed deflection coils 8 and 10. The scanning pattern may be that customarily employed for both black and white and color television signals, comprising two interlaced fields of lines.

The target area 6 includes a large number of side-by-side strips 7 of material fluorescent on electron impact in three primary colors, typically red, blue, and green, the strips being laid down in a cyclically repeating order. For brevity, the strips hereinafter will be referred to as red, green, and blue strips to identify the color of the light which they produce upon electron impact. In FIGURE 1, the three colors are identified as J, K and L, and the cyclical order of strips is seen to be J, K and L. It is also seen that between adjacent color strips there is repeated an area *x*, in which no color appears, and which is an opaque. This *x* area may be designated as a guard band. In other words, upon electron impact no light indicative of a particular color will be noticeable at such guard band areas.

For any set of three additive primaries, three different arrangements of the screen or target in which those colors can be allocated to the positions *x*, *y*, and *z* in the cycle is possible. In the instant case, red is assigned the J position, green the K position, and blue the L position, although it is possible to rearrange the respective positions to have green or blue occupying the J position provided the cycle is kept the same.

The tube includes between the gun and the target area, nearer the latter, a deflection grid generally indicated at 12. This grid includes three sets of interleaved mutually insulated conductors, 14, 15 and 16, which extend generally parallel to the strips and to the target area surface. Switching voltages may be applied between the three sets of grid conductors, at electrodes 17, 18, 19. In FIGURE 1 only a few of the grid conductors 14, 15, 16 are shown for purposes of illustrations, but the number of grid wires and strips may be varied considerably. For example, the instant embodiment involves using 84 wires per inch with one colored phosphor strip of the screen surface under each of the grid wires and the space between grid wires on the screen surface filled in with an inert material which remains non-luminous upon electron impace.

For simplicity of drawing the tube face bearing the target 6 has been shown flat in FIGURE 1. It may, however, be curved and the switching grid may be correspondingly adjusted in shape to properly match the curvature of the target surface so as to achieve the best compromise for uniform switching deflection sensitivity. Similarly, the thickness of the phosphor strips has been greatly exaggerated in order to illustrate their various colors.

The target area is overlaid on the electron-gun side adjacent the switching grid, with a thin metallic (preferably aluminum) electron-permeable layer 22 by means of which a post-deflection-focusing voltage may be applied between the target area and the mean potential of the switching grid. The over laying of the target or screen area comprising the respective colored phosphor strips and guard bands may be accomplished in accordance with electron printing techniques as taught in applications by H. Kasperowicz and P. Raibourn, Serial No. 831,560, filed August 4, 1959, and H. Kasperowicz and K. Suehnholz, Serial No. 831,980, filed August 6, 1959. These applications teach the art of programming information on a given supporting surface of a positional and dimensional nature by means of a controllable electron beam.

An accelerating voltage of the order of 5 kv. may be applied between the second anode of the electron gun and the switching grid 12, and a post-deflection voltage of the order of 15 kv. may be applied between the grid 12 and the conducting layer 22 on the screen 6. This post-deflection voltage serves to constitute the grid wires, together with the conduction layer 22, into a multiplicity of converging cylindrical electron lenses, one between each pair of adjacent grid wires and the screen so that the electron beam will undergo supplemental focusing in passing from the location of the grid to the screen.

The switching voltage applied between the grid conductors 14, 15, and 16, serves to impose on the electron beam a supplemental or micro-deflection which directs the scanning electron beam at appropriate times to a strip on the target area of the proper color. The strips are of such width that in the dimension transverse to their length at least one strip of each primary color will be encountered in traverse of a distance less than the linear-dimension of a picture element. The strip width is accordingly of sub-elemental magnitude. The picture elements of the screen are selected in succession by the line and field scanning currents applied to the deflection coils 8 and 10. Within each elemental area selected, the sub-elemental area of appropriate color is selected by a switching voltage of correct amplitude and phase.

In cathode-ray tubes for color television reception having a switching grid of the type described above, it had been customary to dispose electron optically behind adjacent grid conductors, strips of two colors alternately with a strip of the third color centered between the two conductors of each pair of adjacent conductors. In such a tube therefore there were as many strips of this last color as there are conductors in the switching grid and half as many strips of each of the other two colors. Accordingly, the resolution had been twice as high as in the color of the centered strips. Specifically, it had been customary to make the centered strip a green strip in order to maximize the brightness of the reproduced picture by reason of the fact that with (reference to the primaries of the N.T.S.C. signals) the green, red, and blue primaries contribute brightness to standard white in the propositions, 0.59, 0.30 and 0.11 and by reason of the fact that the green largely carries the resolution for the eye. Such a strip configuration is illustrated in FIGURE 3 of Patent No. 2,745,035. The configuration contemplated herein and illustrated in FIGURE 1, shows a spaced red, green, blue sequence, with guard band strips lying between adjacent colors and grid wires, and the red, green and blue strips lying below the respective grid wires. The red, green and blue strips are electron-optically disposed behind adjacent conductors or grid wires. Since we here have equal numbers of the respective colored strips we truly have a screen having equal color resolution. However, no restriction upon phosphor sequence or their position relative to the switching grid conductors is implied. In any one application, it is necessary to rigorously maintain position. But, it is just as feasible to construct a color tube with the phosphor stripes located between the grid wires (when viewed from the color center at the origin of beam scanning). It is also possible to construct a phosphor array such that three color groups lie behind, or between, each switching grid wire.

To appropriately excite the color strips excitation voltages must be applied sequentially to the color switching grids so that first the red phosphors are excited, next the blue, and finally the green, the sequence being repeated at some desirable cyclical rate. Since the tube here involves a three phase system of switching, it may be appropriate to show how a three phase system operates to excite the various colored phosphors. Now referring to FIGS. 2*a*–2*d* it can be seen that by maintaining a positive polarity on one of the grid electrodes relative to the other two electrodes of the switching grid the electron beam will be deflected and focused, in accordance with well-known post-deflection focusing principles as described in U.S. Patent No. 2,692,532, at the strip behind the grid wires having the positive polarity. Stray electrons falling on adjacent sides of the excited strip will actually fall onto the guard band areas where there will be no light output as the result of such impingement. Hence, we get purity of color and no contamination. Further, it may be appreciated here that because of the guard band areas there will be no optical dispersion or scattering of light between adjacent color strips as a result of the impingement of the beam upon one and not the other. In this manner of operation we get no color dilution and better contrast-qualities of the viewing image. With no potential difference between the respective grid electrodes the beam will not undergo any micro-deflection but will go straight between the wires directly to the guard bands, thus producing no light output. D.C. switching voltages have been applied to the grid electrodes as shown in FIGURES 2*a*–2*d* but it may also be desirable to apply to the three grid terminal electrode system, a system of three phase alternating switching signals.

In FIGURE 4, we observe a fragmentary section of the grid and screen area of the tube and for illustration purposes we show a three phase waveform or three sinusoidal waves *a*, *b*, and *c*, displaced 120 degrees apart in time and how they are applied relative to the grid conductors. Essentially, what took place with D.C. excitation would also take place with A.C. excitation but at a cyclic rate equal to the frequency of the exciting A.C. signal voltages. In the instant case, since we are concerned with N.T.S.C. standards, this rate would be equal to approximately 3.58 megacycles. Under the condition when the switching voltage is reduced in amplitude toward zero which may be deliberate or accidental, the excitation of the phosphor stripes is diminished uniformly. The white color which is ordinarily obtained with complete switching voltage is reduced in brightness through the gray scale by diminished switching. Theoretically this means the tube will go dark in the absence of switching. No color shift will occur due to reduced switching voltages as was the case in previous tubes of this type.

A particular feature of this invention is the deliberate imposition of the guard bands of light absorbing material. Preferably these guard bands should reduce the ability of the beam in generating back scatter electrons. Nevertheless, the approximately 50% reduction of light emitting phosphors in the screen area reduces back scatter halation by at least this amount, if not more. In the preferred embodiment of this invention, with the phosphor stripes aligned behind the switching grid wires, it is readily shown that about 33% of highlight brightness is lost by the non-luminous guard bands. This is due to the relative dwell time of the sinusoidally switched, PDF electron beam between the phosphor to guard band space. With D.C. or low frequency pulse switching the screen efficiency is exactly 67%. Thus it is obvious that an inherent improvement in contrast is obtained because of the relative reduction of the back scatter beam energy. Furthermore, a selective attenuation of all back scatter halation is obtained by the absorptive properties of the thickened aluminum backing layer used to apply the accelerating anode voltage to the phosphors.

Again referring to FIGURE 4, it can be seen that by three phase switching, the beam will undergo a supplemental scanning along the selective color strips in a sequential order, e.g. first red, then blue and then green, again repeating the sequence where the individual selective color scanning takes place in a very regular order every 120 degrees. This is essentially analogous to a three phase A.C. motor system where you have three A.C. fields displaced 120 degrees apart so that these give rise to a resulting magnetic field operating on the motor armature windings at the frequency rate of the applied electric fields. This closely approximates the sequence of the chrominance signal waveform of standard N.T.S.C. color television broadcasting. A vector diagram FIGURE 5*a* shows vectorially how the color signals in a standard N.T.S.C. system are transmitted to the tube and that for the most part they substantially correspond to the three phase arrangement previously described. In particular, it can be seen that the burst or color sync signal lies on the axis approximately 119 degrees behind the blue signal. Under these conditions of three phase operation, it is possible to directly decode the color composite signal. This is accomplished simply by applying a composite chrominance plus luminance signal, available at the output signal from a color broadcast transmission system, directly to the control electrode of the electron gun of the color tube on which the color picture will be directly displayed and simultaneously applying the color carrier signal of 3.58 mc. to the three phase grid system.

What is achieved is substantially a complete self-decoding system with no additional circuitry required. This makes for a simple, efficient and economical color receiver system. It is not implied that the direct decoding scheme mentioned above is the only possible color receiver application for this color tube. In some schemes more flexibility is obtained by fundamental frequency, three phase axis selection of the chrominance portion of the composite color signal, as demonstrated in patent application by Paul Raibourn entitled "Color Television Reception," Serial No. 40,678, filed July 5, 1960, and "Color Signal Reception," Serial No. 40,744, filed July 5, 1960. A balanced Chromagate operation is readily demonstrable. It is to be stressed that the uniform phosphor sequence makes for uniformity in color balance in all phase of chromaceiver design.

In FIG. 3 there is shown a color receiver suitable for operation of the color tube according to the invention. This receiver develops, for application to a control electrode of the cathode-ray tube, for example either its cathode 3 or its first control grid 5, a voltage equivalent to the N.T.S.C. color signals. In particular there is shown at 30 a color television receiver which may be conventional and which performs all the customary functions of a television receiver up to that of the second detector. At the output of the receiver 30 there is shown a diode 31 which functions as a second detector. This second detector delivers to an amplifier 32 the complete video signal including luminance and chrominance, synchronizing signals for line and field scanning, and also the color sychronizing or "burst" signal. In the N.T.S.C. signal, this "burst" signal comprises a few cycles at color sub-carrier frequency and fixed phase relative to the color sub-carrier used in developing the chrominance at the transmitter, superimposed on the horizontal blanking pulses.

From the detector 31 this total video signal is sent broadly through two channels. Amplifier 32 with a frequency selecting network 34 in its output serves to select the chrominance component in the 3–4 mc. range while the 0 to 3 mc. luminance component is developed across a frequency nonselective circuit illustratively shown as a resistor 36. The circuit for deriving from the video output of receiver 30 suitably timed line and field scanning currents for application to the deflection coils 8 and 12 of tube 4 has been omitted from FIGURE 3, since it may be entirely conventional. Similarly, the sound separating and amplifying circuits have been omitted, and there have also been omitted the circuits for developing accelerator voltages in the cathode-ray tube, which may likewise be conventional.

The chrominance, after passage through amplifier 38 is delivered to a sub-carrier regenerator 44 which has the function of generating under control of the burst a continuous oscillation at color sub-carrier frequency and fixed phase with reference to the burst. A color sub-carrier regenerator circuit is disclosed in the article entitled "Compatible Color TV Receiver" at pages 98 to 104 of Electronics for February 1953. An additional function of the regenerator 44 is to provide three-phase switching voltages for the cathode-ray tube. These voltages take the form of sinusoidal three phase voltages of color sub-carrier frequency, locked in respective phases with reference to the received burst signal, and applied in balanced three phase fashion to conductors 18, 19, and 20, advantageously through a suitable adjustable phase shifting network 45, which permits the respective electrodes forming the grid to be electrically phased approximately 120 degrees apart. The chrominance signal from the output of circuit 40 is also delivered to the control grid 5 of tube 4, so that the synchronous combination of the luminance, chrominance and switching signals when delivered to the tube 4 results in an image on the tube comparable to the transmitted color television image.

Referring to FIG. 1, it can be seen that for illustration purposes, the grid and screen appear to be flat and parallel to each other. However, in practice it has been found necessary to provide a cylindrical grid frame structure having straight line conductors and a commercially available spherical face plate. In this combination it has been found that the distance between the grid and screen is not constant but generally varies getting progressively smaller as you deviate from the centers and proceed toward the outer extremities of the screen and grid. This distance is sometimes referred to as the bar height. It is readily appreciated, from optical analogy, that the post-deflection-focused (PDF) electron beam impinging upon the screen varies in strip width as a function of the object to image spacing. A (pre-deflection) focused beam has the object distance of the space existing between the switching grid and the center of deflection which coincides with the electron printed virtual color plane. As the image distance varies between the cylindrical grid surface and a spherical face-panel surface the post-deflection-focusing (PDF), by the electronic lenses contoured by the grid wire pitch, varies too. Thus, the PDF electron beam width is substantially a direct function of the bar height. This is also the situation for the PDF electron beam deflection position on the phosphor screen surface for a voltage applied between the switching grid wires. As the bar height decreases so does the PDF beam width and deflection amplitude.

There is shown in FIGURE 6 a fragmentary view of the color tube face plate and the adjacent switching grid along one of its many radii. Whereas the grid wire pitch remains reasonably constant the relative widths of the guard band space and phosphor space is not. This comes about due to progressively shortened spacing between grid and screen. With a fixed set of operating conditions in the electronic screen printing operation the resultant printed line widths of phosphors varies with the bar height distance as noted in the previous paragraph. Any remaining areas are made guard-band space. You may appreciate how well this fits into a simplified playback condition in the fully assembled chromatron. A closely matched set of operation voltages, on the anode, switching grid and electron gun duplicate the electronically affixed phosphor stripe registry. Utilizing a high rate of switching, as in the synchronized 3.58 megacycle sinusoidal voltage applied in triple phasing, the PDF electron beam dwell time is substantially constant across the vari-width color stripes. It is obvious this allows much latitude in mechanical spacing tolerances with the switching grid mated to its associated panel. In practice this permits the use of available TV glassware despite its non-ideal inside surface.

The problem of producing strips of non-uniform width is non-existent with electron printing techniques as taught in the above mentioned applications. The screen is constructed and printed in the identical manner in which it is to be played and that all of the inherent limitations produced during the printing process will become comparable during the playing process so that no effective discrepancies will be discernible by the viewer. In other words, all of the deviations produced in printing will be matched in playing and no discernible difference will be evident.

It may be appreciated that there may be other modes of operation and other materials pertinent to the invention as embodied herein. As, for example, the guard band material, although specified as inert, may be comprised of graphite or low melting solder glass and the like, the said materials as previously stated being insensitive to the impingement of an electron beam. The invention as shown further refers to the placement of color phosphors under the respective grid wires. These positions may be revised in that the color phosphors may be placed between respective grid wires with the inert material placed beneath the stated grid wires. In such an arrangement, it may be appreciated that where there is no switching, that is to say the potential difference between the grid electrodes is zero, the result would be an all white picture.

Having defined the invention, what is claimed is:

1. In a color cathode-ray tube having an electron gun for generating a beam of electrons and a conductive coating disposed thereon across which said beam is adapted to be deflected, an electrode system comprising an apertured electrode structure of substantially equal area to said target area mounted within said tube adjacent to said target area and at a substantially uniform distance therefrom, said apertured electrode structure comprising a plurality of parallel interleaved grill-like grid elements, a target area having a conductive coating disposed thereon across which said beam is adapted to be deflected and comprising a plurality of parallel spaced colored phosphor strips generally parallel to the grid elements, each colored phosphor being disposed to appear behind each of the said grid elements and an inert material being relatively thicker and lying between the respective colored phosphor strips and grid elements, electrical potential means connected to the said electrode structure for producing a multiplicity of converging electron lenses between the said apertured electrode structure and target area for focusing the said beam upon the colored strips of the target area.

2. In a color cathode-ray tube having an electron gun for generating a beam of electrons and a conductive coating disposed thereon across which said beam is adapted to be deflected, an electrode system comprising an apertured electrode structure of substantially equal area to said target area mounted within said tube adjacent to said target area and at a substantially uniform distance therefrom, said apertured electrode structure comprising a triad of parallel interleaved grill-like grid elements, a target area having a conductive coating disposed thereon across which said beam is adapted to be deflected and comprising a plurality of repetitive triad parallelly spaced colored phosphor strips disposed to produce white in the aggregate and generally parallel to the grid elements, each colored phosphor being disposed to appear behind each of the said grid elements and an inert material being relatively thicker and being disposed to lie between the respective colored phosphor strips and grid elements, three phase electrical potential means connected to the said electrode structure for producing a multiplicity of converging electron lenses between the said apertured electrode structure and target area for focusing the said beam upon the colored strips of the target area.

3. In a color cathode-ray tube having an electron gun for generating a beam of electrons and a conductive coating disposed thereon across which said beam is adapted to be deflected, an electrode system comprising an apertured electrode structure of substantially equal area to said target area mounted within said tube adjacent to said target area and at a substantially uniform distance therefrom, said apertured electrode structure comprising a plurality of parallel interleaved grill-like grid elements, a target area having a conductive coating disposed thereon across which said beam is adapted to be deflected and comprising a plurality of repetitive spaced triads of parallel colored phosphor strips generally parallel to the grid elements, each triad of colored phosphor strips being disposed to appear between each of the said grid elements and an inert material being disposed to lie under each of the grid elements between each of the spaced triads of colored phosphors, colored phosphor strips, electrical potential means connected to the said electrode structure for producing a multiplicity of converging electron lenses between the said apertured electrode structure and target area for focusing the said beam upon the colored strips of the target area.

4. A television receiver for the display of color television signals of the color sub-carrier type employing three primary colors JKL additive to produce white, said receiver including in a cathode-ray tube a multiplicity of spaced phosphor strips laid down on a target in a cyclical order JKL JKL with inert material between respective spaced phosphor strips relatively thicker and a switching grid composed of three interleaved mutually insulated electrodes each having a plurality of parallel conductors adjacent said target with the conductors of each electrode electron-optically aligned with each phosphor strip, said receiver further including means to apply between the respective electrodes a three phase switching voltage integrally related to the color sub-carrier frequency with each of the respective electrodes electrically displaced in phase relation by 120 degrees, and means to develop luminance and chrominance signals for application to the cathode-ray tube.

5. A television receiver for the display of color television signals of the color sub-carrier type employing three primary colors red, green, and blue additive to produce white, said receiver including in a cathode-ray tube having electron beam control electrodes a multiplicity of spaced phosphor strips laid down on a target surface in a cyclical order red, green and blue with inert graphite material between respective spaced phosphor strips relatively thicker and a switching grid structure composed of three interleaved mutually insulated electrodes each having a plurality of parallelly spaced conductors adjacent said target with the conductors of each electrode electron-optically aligned with each phosphor strip, said receiver further including means for developing and applying to the respective electrodes a three phase switching voltage integrally related to the color sub-carrier frequency with each of the respective electrodes electrically displaced in phase relation by 120 degrees, and means to develop luminance and chrominance signals for application to the cathode-ray tube control electrodes.

6. A television receiver for the display of color television signals according to claim 5 and wherein the means for developing the three phase switching voltages includes a burst-synchronized sub-carrier regenerator with individual phase control for controlling the phases of the respective voltages relative to each other.

References Cited in the file of this patent

UNITED STATES PATENTS

| | | |
|---|---|---|
| 2,897,261 | Jones | July 28, 1959 |
| 2,971,048 | Lawrence | Feb. 7, 1961 |